United States Patent
Nguyen et al.

(10) Patent No.: US 8,041,657 B1
(45) Date of Patent: Oct. 18, 2011

(54) SYSTEMS AND METHODS FOR PROVIDING DIGITAL WORKS BASED ON USER PREFERENCES

(75) Inventors: Laurent An Minh Nguyen, Los Altos, CA (US); Steven Ka Cheung Moy, San Francisco, CA (US); James R. Retzlaff, II, San Jose, CA (US); John T. Kim, La Canada, CA (US)

(73) Assignee: Amazon Technologies Inc., Reno, NV (US)

( * ) Notice: Subject to any disclaimer, the term of this patent is extended or adjusted under 35 U.S.C. 154(b) by 910 days.

(21) Appl. No.: 12/017,976

(22) Filed: Jan. 22, 2008

(51) Int. Cl.
G06F 15/18 (2006.01)
G06F 17/21 (2006.01)
G06F 17/20 (2006.01)

(52) U.S. Cl. ............. 706/14; 706/20; 706/21; D14/370; D14/570; D14/138 R

(58) Field of Classification Search .................. 706/14
See application file for complete search history.

(56) References Cited

U.S. PATENT DOCUMENTS
2004/0225519 A1* 11/2004 Martin .............................. 705/1
* cited by examiner Primary Examiner — Jeffrey A Gaffin
Assistant Examiner — Nathan Brown, Jr.
(74) Attorney, Agent, or Firm — Lee & Hayes, PLLC

(57) ABSTRACT

A method for providing digital works based on user preferences is described. Data associated with a plurality of digital works is analyzed. The plurality of digital works are classified based on the data analysis and on a first list and on a second list. The first list includes preferred words, and the second list includes non-preferred words. One or more digital works from the plurality of digital works are transmitted. The one or more digital works transmitted were classified as works to be transmitted using the first list.

25 Claims, 7 Drawing Sheets

SYSTEMS AND METHODS FOR PROVIDING DIGITAL WORKS BASED ON USER PREFERENCES

TECHNICAL FIELD

The present disclosure relates generally to electronic devices and computer-related technologies. More specifically, the present disclosure relates to systems and methods for classifying a digital work based on the preferences of a user.

BACKGROUND

Electronic distribution of information has gained in importance with the proliferation of personal computers and has undergone a tremendous upsurge in popularity as the Internet has become widely available. With the widespread use of the Internet, it has become possible to distribute large, coherent units of information using electronic technologies.

Advances in electronic and computer-related technologies have permitted computers to be packaged into smaller and more powerful electronic devices. An electronic device may be used to receive and process information. The electronic device may provide compact storage of the information as well as ease of access to the information. For example, a single electronic device may store a large quantity of information that might be downloaded instantaneously at any time via the Internet. In addition, the electronic device may be backed up, so that physical damage to the device does not necessarily correspond to a loss of the information stored on the device.

In addition, a user may interact with the electronic device. For example, the user may read information that is displayed by the electronic device. Further, the user may instruct the device to display a specific piece of information stored on the electronic device. As such, benefits may be realized from improved systems and methods for interacting with an electronic device.

DETAILED DESCRIPTION

Figure 1:
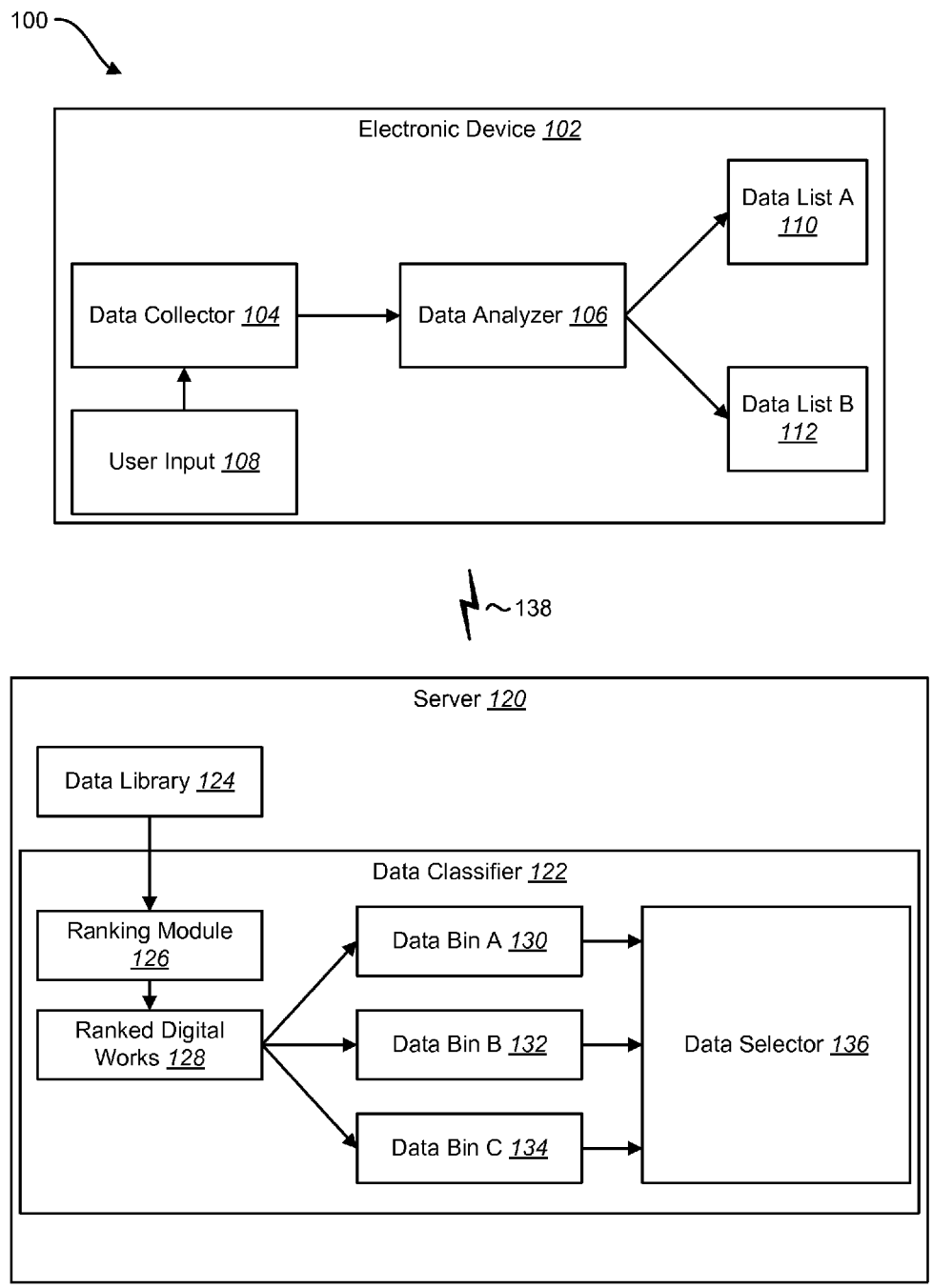
FIG. 1 is a block diagram illustrating one example of an electronic device in communication with a server.

A method for providing digital works based on user preferences is described. Data associated with a plurality of digital works is analyzed. The plurality of digital works are classified based on the data analysis and on a first list and on a second list. The first list includes preferred words, and the second list includes non-preferred words. One or more digital works from the plurality of digital works are transmitted. The one or more digital works transmitted were classified as works to be transmitted using the first list.

In one configuration, training data is received. The training data may include at least two sets of data. A first set of data may include preferred words. The preferred words may be included in a digital work that a user has shown interest in. In one example, a second set of data includes non-preferred words. The non-preferred words may be included in a digital work that a user has not shown interest in.

A ranking threshold may be adjusted in accordance with the received training data. A ranking may be assigned to each of the plurality of digital works based on the first list and the second list. In one configuration, the classification uses a plurality of bins to organize the plurality of digital works. The one or more digital works may be transmitted to an electronic book reader. Contents of a digital work may be rearranged based on the first list and on the second list. The steps above may be performed by a computer program.

An electronic book reading device is also described. The device includes a display, a processor and memory in electronic communication with the processor. Instructions are stored in the memory. The instructions are executable to receive input from an input component on the device. The input component is configured for receiving user input. The instructions are also executable to collect data relating to the input. The data includes a plurality of words. The instructions may further be executable to store a first list in the memory. The first list includes preferred words. The instructions may also be executable to store a second list in the memory. The second list includes non-preferred words.

A computer system that is configured to provide digital works based on user preferences is also described. The computer system includes a processor and memory in electronic communication with the processor. Instructions are stored in the memory. The instructions are executable to analyze data associated with a plurality of digital works and classify the plurality of digital works based on the data analysis and on a first list and on a second list. The first list includes preferred words. The second list includes non-preferred words. The instructions are also executable to transmit one or more digital works from the plurality of digital works. The one or more digital works transmitted were classified as works to be sent using the first list.

A computer-readable medium comprising executable instructions is also described. The instructions may be executable for analyzing data associated with a plurality of digital works and classifying the plurality of digital works based on the data analysis and on a first list and on a second list. The first list includes preferred words. The second list includes non-preferred words. The instructions are further executable for transmitting one or more digital works from the plurality of digital works. The one or more digital works transmitted were classified as works to be transmitted using the first list.

A computer system that is configured to provide digital works based on user preferences is also described. The computer system includes means for analyzing data associated with a plurality of digital works and means for classifying the plurality of digital works based on the data analysis and on a first list and on a second list. The first list includes preferred words. The second list includes non-preferred words. The computer system also includes means for transmitting one or more digital works from the plurality of digital works. The one or more digital works transmitted were classified as works to be transmitted using the first list.

Electronic devices may be used by a user to purchase and download digital works via the Internet. The digital works may be stored in an online store maintained by an online merchant. Substantial time and energy may be used by the user to search through the digital works stored in the online store before the user locates a desired digital work. In addition, the online store may include a significant quantity of digital works. As such, the user may not be aware of numerous digital works that would be of interest to the user.

Current systems and methods may track the history of transactions associated with a particular user. For example, current systems may store the titles of digital works purchased by the user. When the user desires to purchase additional digital works, current systems simply display items that have been previously purchased by the user. However, current systems do not dynamically adjust parameters that track the preferences of a user. As such, benefits may be realized by providing systems and methods that provide a user with digital works that may be of interest to the user as the preferences of the user change over time.

FIG. 1 is a block diagram 100 illustrating one example of an electronic device 102 in communication with a server 120. The device 102 may be in electronic communication with the server 120 via a link 138. The link 138 may be a wireless link. The server 120 may be maintained by an online merchant, which may offer products and/or service to customers via a web site (not shown). The electronic device 102 may be an electronic book reading device. Electronic books ("eBooks") are digital works. The terms "eBook" and "digital work" are used synonymously and, as used herein, may include any type of content which may be stored and distributed in digital form. By way of illustration, without limitation, digital works and eBooks may include all forms of textual information such as books, magazines, newspapers, newsletters, periodicals, journals, reference materials, telephone books, textbooks, anthologies, proceedings of meetings, forms, directories, maps, manuals, guides, references, photographs, articles, reports, documents, etc., and all forms of audio and audiovisual works such as music, multimedia presentations, audio books, movies, etc. Digital works and eBooks may be stored within a data library 124. In one configuration, the data library 124 may be referred to as an online bookstore.

In one configuration, the electronic device 102 includes a data collector 104. The collector 104 may collect various forms and types of data. For example, the data collector 104 may collect data relating to digital content that is being consumed by a user of the electronic device. The collector 104 may collect words and sentences that indicate the digital content being consumed by the user. For example, the collector 104 may collect book titles, newspaper titles, article titles, words in a uniform resource locator (URL), etc. In another configuration, the data collector 104 collects behavioral data. For example, the data collector 104 tracks what time the user reads, the length of time the user browses a web site via the Internet, etc. The collector 104 may be triggered to collect and track data when user input 108 is detected. For example, the user may select a book to be displayed on the electronic device 102. The data collector 104 may collect the title of the selected book. In addition, if a user selects a newspaper to be displayed on the device 102, the collector 104 may collect the title of the newspaper.

In another configuration, the data collector 104 may collect data that is not consumed by the user. For example, the user may select to display a newspaper via the user input 108. The user selects certain articles to be displayed on the device 102 and the user may select an option to skip other articles within the newspaper. The titles of the selected articles that the user wishes to display on the device 102 are collected. In addition, the titles of the articles that the user skipped are also collected by the collector 104.

The electronic device 102 also includes a data analyzer 106. The analyzer 106 analyzes the data collected by the data collector 104. The analyzer 106 determines if the collected data relates to digital data consumed by the user of the device 102 or if the data relates to digital data that was not consumed by the user (data that was skipped). The data analyzer 106 stores a list of digital data that was consumed by the user in data list A 110. A list of the digital data that was not consumed by the user may be stored in data list B 112. Data lists A and B 110, 112 may be uploaded to the server 120. In addition, the lists A and B 110, 112 may be used to train a data classifier 122 included on the server 120. Details relating to the training of the data classifier 122 will be discussed more fully below in relation to FIG. 2.

As previously mentioned, the server 120 includes a data classifier 122 that classifies digital works within the data library 124. Each of the digital works may be classified in accordance with the preferences of a user. In one configuration, each of the digital works within the data library 124 is processed periodically by the data classifier 122 in order to receive a ranking. For example, the classifier 122 may classify each of the digital works within the library 124 every day, once a week, etc. The classifier 122 classifies each of the digital works within the library 124 as interesting to a user, not interesting to the user or unknown.

A ranking module 126 may receive each of the digital works and assign a ranking to the digital works. The ranking may indicate the classification of the work (e.g., interesting to the user, not interesting to the user, unknown, etc.) The ranking module 126 may be adjusted or trained by evaluating data lists A and B 110, 112. Ranked digital works 128 may be stored in one of a plurality of data bins 130, 132, 134. For example, digital works that receive a ranking indicating that the work is interesting to the user may be stored in data bin A 130. Digital works that are ranked so as to indicate the work is not interesting to the user may be stored in data bin B 132. Digital works that are ranked so as to indicate it is unknown whether or not the contents of the work are interesting to the user may be stored in data bin C 134.

The data bins 130, 132, 134 may store the digital works in their entireties. In addition, the data bins 130, 132, 134 may simply store identifiers, links, URLs (Uniform Resource Locators), path names, pointers, etc., for the digital works. A data bin is a place to store electronic data and may be implemented in various ways including, but not limited to, a storage device, a directory on a storage device, a file, a folder, a database, a cache, etc.

A data selector 136 may analyze the contents of each of the plurality of data bins 130, 132, 134 and/or the contents identified by information in the data bins 130, 132, 134. Based on the analysis, the data selector 136 may determine which digital works are downloaded to the electronic device 102. The data selector 136 may also determine the order of the data within the digital work that is displayed to the user. For example, the data library 124 may include several electronic newspapers. A first newspaper may receive a higher ranking from the ranking module 126 if the user has previously selected the first newspaper to be displayed on the electronic device 102. A second newspaper may receive a lower ranking if the user has not selected the second newspaper to be displayed previously. The first newspaper may be stored in data bin A 130 which represents digital works that are of interest to the user. The second newspaper may be stored in data bin B 132 which represents digital works that are not interesting to the user. The data selector 136 may determine to download a part or all of the first newspaper to the electronic device 102 so that the user may choose to purchase or subscribe to the first newspaper. The data selector 136 may determine to not download a part (or all) of the second newspaper because there is a higher probability that the contents of the second newspaper are not of interest to the user.

Figure 2:
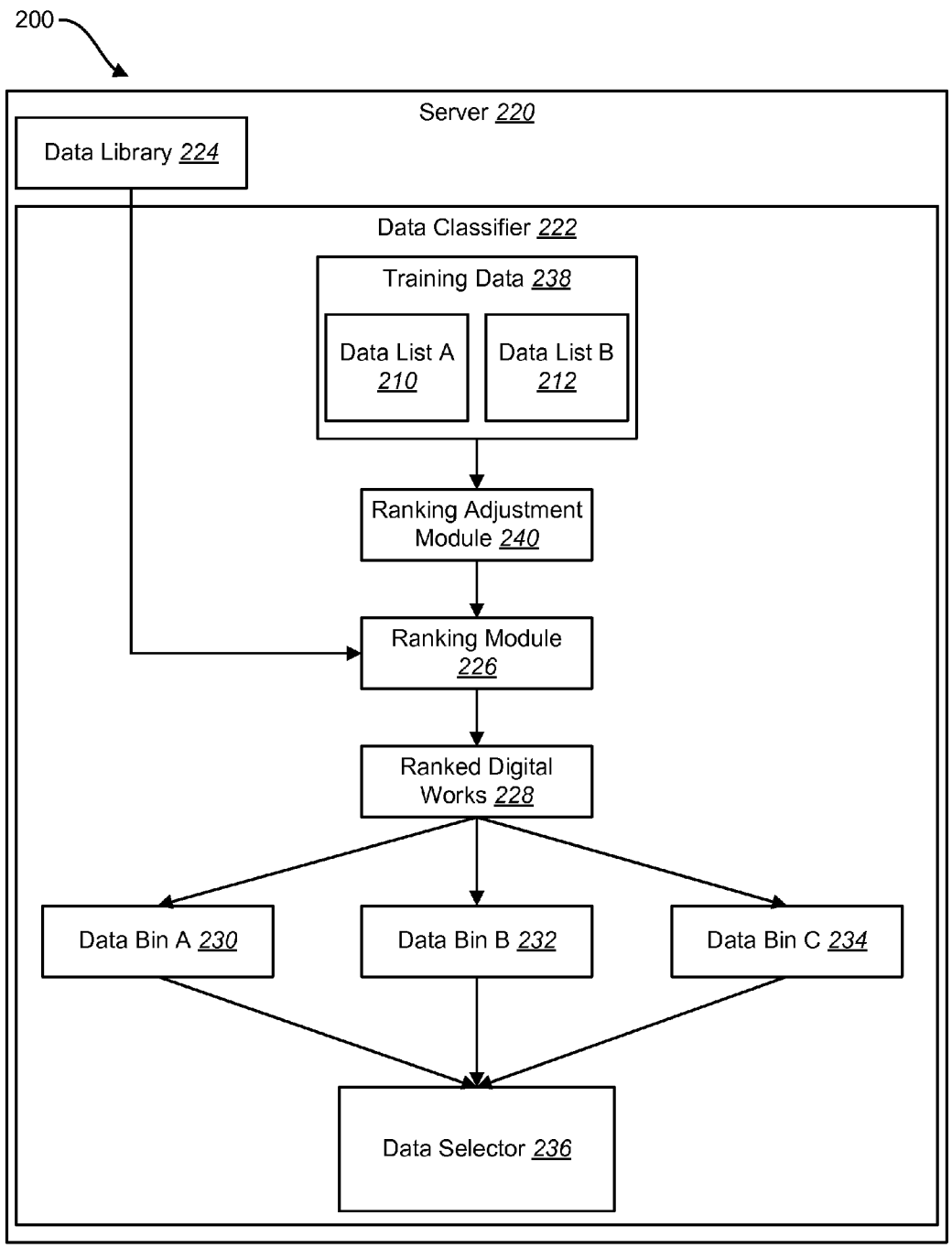
FIG. 2 is a block diagram illustrating one example of a server that includes a data classifier.

FIG. 2 is a block diagram 200 illustrating one example of a server 220 that includes a data classifier 222. The classifier 222 may be a type of data filter, such as a Bayesian filter. The classifier 222 may utilize training data 238 to train a ranking module 226. The training data 238 may include data list A 210 and data list B 212. As previously explained, data list A 210 may include words or sentences of digital works that a user has (or may have) purchased. For example, data list A 210 may include titles of books, newspapers, magazines, articles, etc. that the user has (or may have) purchased and displayed via the electronic device 102. Data list A 210 may also include words or sentences of digital works that a user has interest in. For example, data list A 210 may include titles of books, newspapers, magazines, articles, etc. that the user has viewed, clicked on, selected, etc.

Data list B 212 may include words or sentences of digital works that the user has not purchased. For example, data list B 212 may include titles of books, newspapers, magazines, articles, etc. that the user has not purchased or displayed via the device 102. Data list B 212 may also include words or sentences of digital works that the user has not shown any interest in. For example, data list B 212 may include titles of books, newspapers, magazines, articles, etc. that the user has not viewed, clicked on, selected, etc.

In one configuration, a ranking adjustment module 240 analyzes the training data 238. The adjustment module 240 may determine if a ranking previously associated with a word or sentence should be adjusted. For example, a user may be presented with a list of possible newspapers to download and display on the device 102. The user may select to download a particular newspaper, for example "The New York Times." As such, the title "The New York Times" may be added to data list A 210. However, in a previous occasion, the user may have skipped over or not purchased "The New York Times." In other words, the title "The New York Times" may have previously been included on data list B 212. The ranking adjustment module 240 receives the training data 238 which now includes the title "The New York Times" on data list A 210. The adjustment module 240 may instruct the ranking module to increase the ranking of digital works included in a data library 224 that include titles with one or more of the words "The New York Times."

As previously mentioned, the data library 224 may include an online store that offers books, newspapers, magazines, music albums, movies, etc. that a user may purchase and/or view. In one configuration, each digital work included in the online store may be ranked by a ranking module 226. As previously explained, ranked digital works 228 may be stored in one of a plurality of bins 230, 232, 234. Each of the plurality of bins stores digital works that are either interesting to a user, not interesting to the user or unknown. For example, a digital work may include the title "The New Yorker." The ranking module 226 ranks the title "The New Yorker" based on the training the module 226 received from the training data 238.

In one example, as used above, data list A 210 includes the title "The New York Times" which represents the title of a newspaper that the user has interest in (e.g., the user purchased and/or viewed on the device 102). As such, the ranking module 226 may assign a higher ranking to the title "The New Yorker" because there is a high probability that the user may be interested in a newspaper with a similar title to a previously purchased and/or viewed newspaper. The ranked digital work 228 including the title "The New Yorker" may be stored in data bin A 230 which represents digital works of interest to the user. A data selector 236 may determine to download and display the title, some portion of, or all of the digital work, "The New Yorker", to the device 102. The data selector 236 determines to download digital works stored in data bin A 230 to the device 102 because there is a high probability that the data stored in data bin A 230 is of interest to the user.

In addition to downloading the title, some portion of, or all of a particular digital work to the device 102, the data selector 236 may rearrange the order of the components included in a particular digital work. In other words, the order that the components are displayed to a user is rearranged. For example, a user may view articles within a magazine relating to basketball. As an example, the magazine title may be "Sports Illustrated." As such, the data selector 236 may download the title, some portion of, or all of the future issues of "Sports Illustrated" to the device 102 with articles relating to basketball placed at the beginning. Since the user has an interest in basketball, the user may quickly determine whether or not to purchase and/or view the particular issue of "Sports Illustrated" based on the quantity and quality of articles relating to basketball.

In other configurations, the data selector 236 may vary the number of articles downloaded to the device 102. In addition, the selector 236 may aggregate blogs of interest to the user into a single blog that is downloaded to the device 102. Further, the selector 236 may download samples of electronic books to the device 102 that are of interest to the user based on the method described above. The samples may be indexed to appear in a user search. Also, the selector 236 may download certain parts of an electronic digital work that may be more appealing to a user. For example, parts of an eBook that include a certain number of words stored in data bin A 230 may be downloaded to the device 102. The user may view the selected parts of the eBook to determine whether or not to purchase and/or view the entire eBook.

Figure 3:
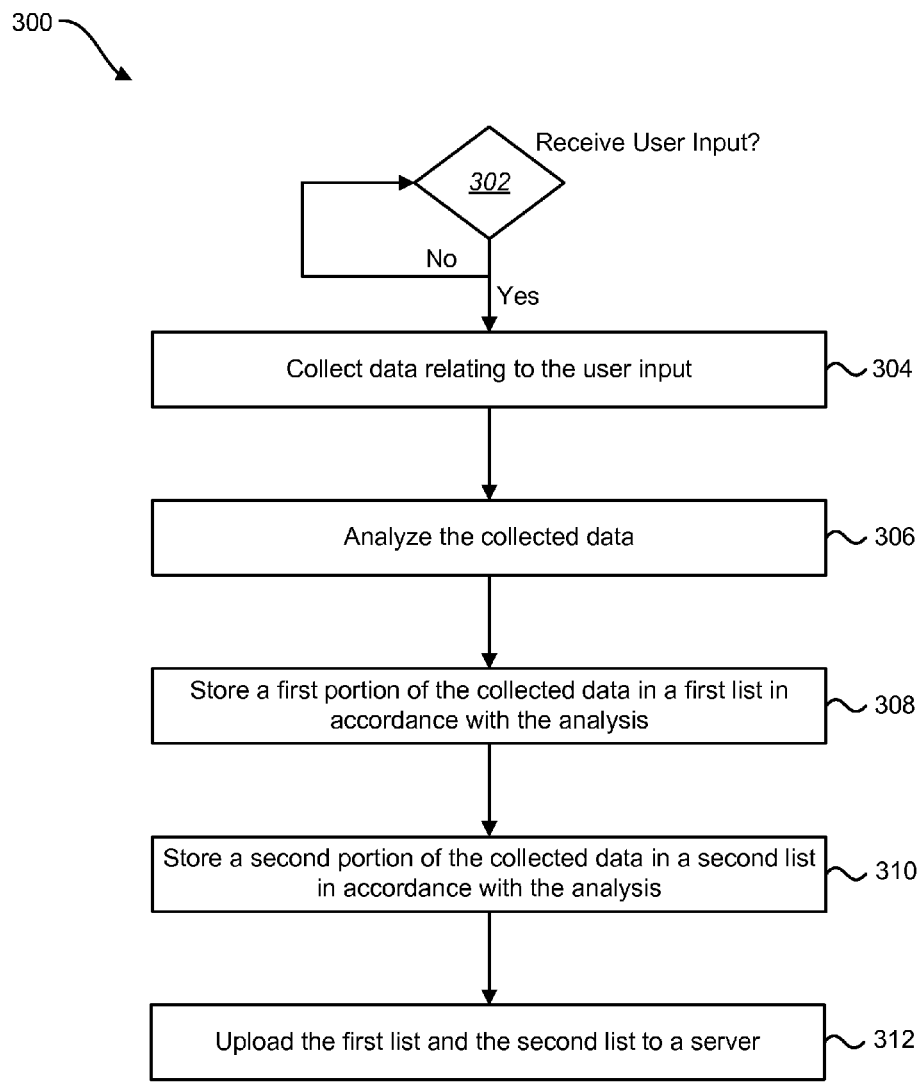
FIG. 3 is a flow diagram illustrating one example of a method for collecting data for a data classifier.

FIG. 3 is a flow diagram illustrating one example of a method 300 for collecting data for a data classifier. The method 300 may be implemented by the electronic device 102. A determination 302 may be made as to whether or not user input has been received. If user input has been received, data is collected 304 that relates to the user input. For example, the user input may include the user opening an eBook, turning a page, clicking on a hyperlink, closing an eBook, skipping pages, etc. Data relating to the opened eBook, page turned, hyperlink clicked, eBook closed, page skipped, etc., is collected 304. In one configuration, the data collected may include words and sentences included in the eBook or digital work. In addition, the collected data may also include words and sentences included in digital works that were not accessed by the user.

The collected data may be analyzed 306. The data may be analyzed 306 to determine the words and/or sentences that may be of interest to the user and words and/or sentences that may not be of interest to the user. In one example, a first portion of the collected data may be stored 308 in a first list in accordance with the analysis. The first list may include words and/or sentences included in digital works that are accessed by the user (e.g., opening an eBook, turning a page, clicking on a hyperlink). A second portion of the collected data may be stored 310 in a second list in accordance with the analysis. The second list may include words and/or sentences included in digital works that are not accessed, not opened, not purchased, were skipped, etc. by the user. The first list and the second list may be automatically stored by the electronic device. For example, the first list and the second list may be stored automatically and without any user control over the storing of the lists. Thus, the user may simply use the electronic device without giving any thought to what may be stored in the first list or in the second list. In one configuration, the first list and the second list 312 are uploaded to a server.

Figure 4:
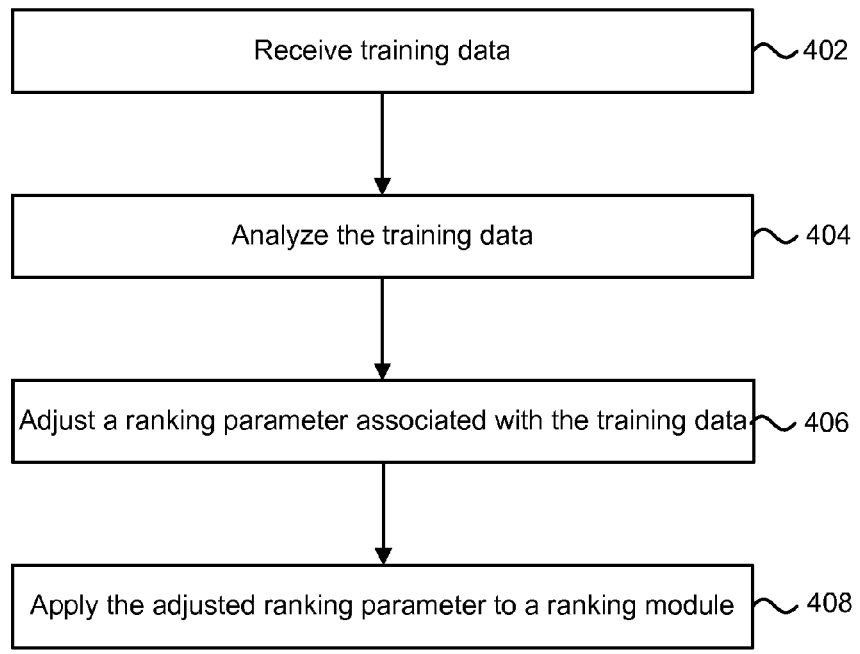
FIG. 4 is a flow diagram illustrating one example of a method for training a data classifier.

FIG. 4 is a flow diagram illustrating one example of a method 400 for training a data classifier 122. The method 400 may be implemented by the server 120. Alternatively, the method 400 may be implemented by the electronic device 102. In one configuration, training data may be received 402. The training data may include the data list A 110 and the data list B 112. The training data may be words and/or sentences associated with digital works that a user has shown interest in (e.g., previously purchased and/or viewed via the electronic device 102) and has not shown interest in (e.g., skipped, not purchased). In addition, the training data may be words and sentences relating to digital works that the user has searched for via the electronic device 102. In one example, the training data is analyzed 404. A ranking parameter associated with the training data may be adjusted 406 based upon the analysis. In one possible configuration the ranking parameter may be adjusted by the ranking adjustment module 240. The ranking parameter may indicate the classification of the work (e.g., interesting to the user, not interesting to the user, unknown, etc.) Accordingly, if at a point in time a user was interested in XYZ, the ranking parameter may indicate that items relating to XYZ should be placed in data bin A 130. If, some time later, the user shows that he is no longer interested in XYZ, the ranking parameter is adjusted to cause items relating to XYZ to be placed in data bin B 132. Further, the adjusted ranking parameter may be applied 408 to a ranking module. The ranking module may use the adjusted ranking parameter to assign a ranking to digital works that are part of the digital library 124.

Figure 5:
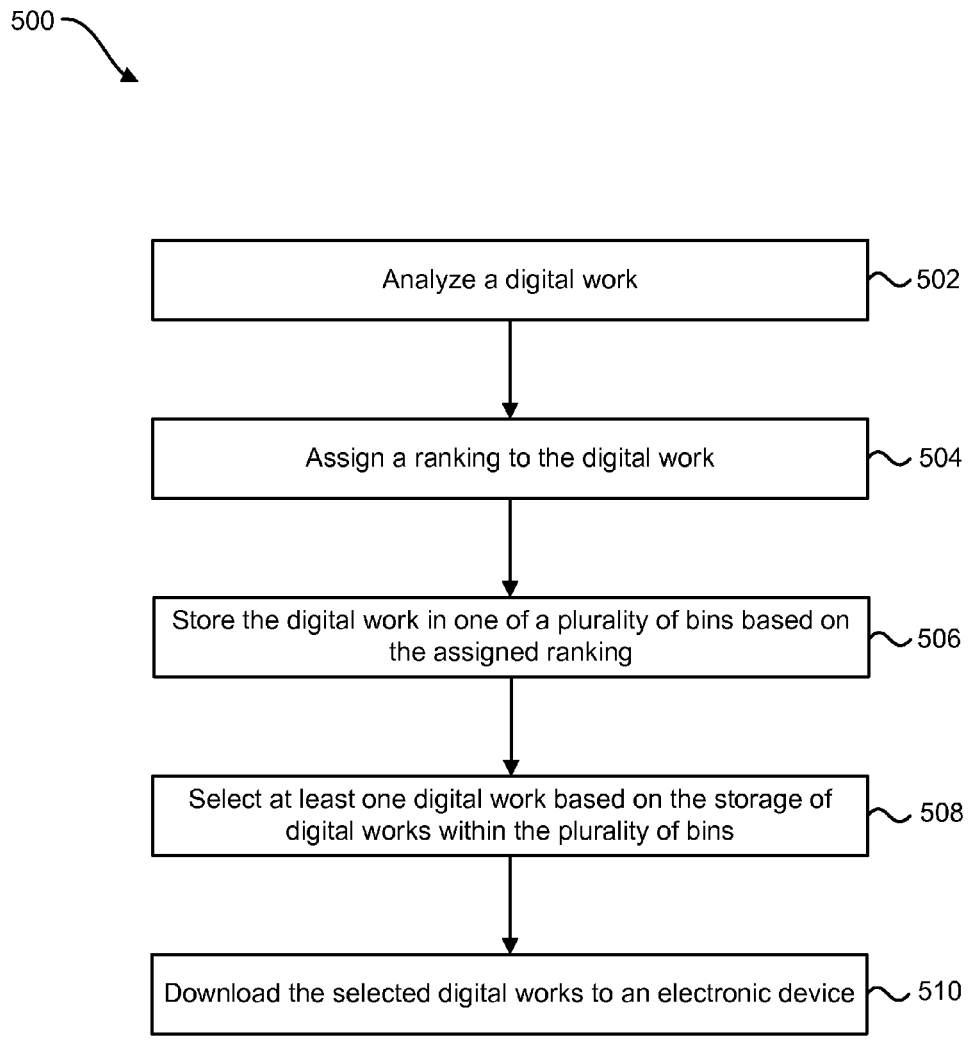
FIG. 5 is a flow diagram illustrating one example of a method for selecting digital works to be provided to a user based on the ranking of the digital work.

FIG. 5 is a flow diagram illustrating one example of a method 500 for selecting digital works to be provided to a user based on the ranking of the digital work. The method 500 may be implemented by the server 120. Alternatively, the method 500 may be implemented by the electronic device 102. In one example, a digital work may be analyzed 502. The analysis may include analyzing 502 words and/or sentences included in the digital work (e.g., title, chapter headings, author, etc.) A ranking may be assigned 504 to the digital work based upon the analysis. The digital work may be stored 506 in one of a plurality of bins based on the assigned ranking. In addition, the data bins 130, 132, 134 may simply store 506 identifiers, links, URLs, path names, pointers, etc., for the digital works. In one configuration, at least one digital work (or a part thereof) may be selected 508. The at least one digital work may be selected 508 based on which of the plurality of bins the work is stored in. The selected digital work (or a part of the work, a title of the work, a hyperlink to the work) may be downloaded 510 to an electronic device 102. If the method 500 is implemented by the device 102, the selected work may be displayed to the user.

Figure 6:
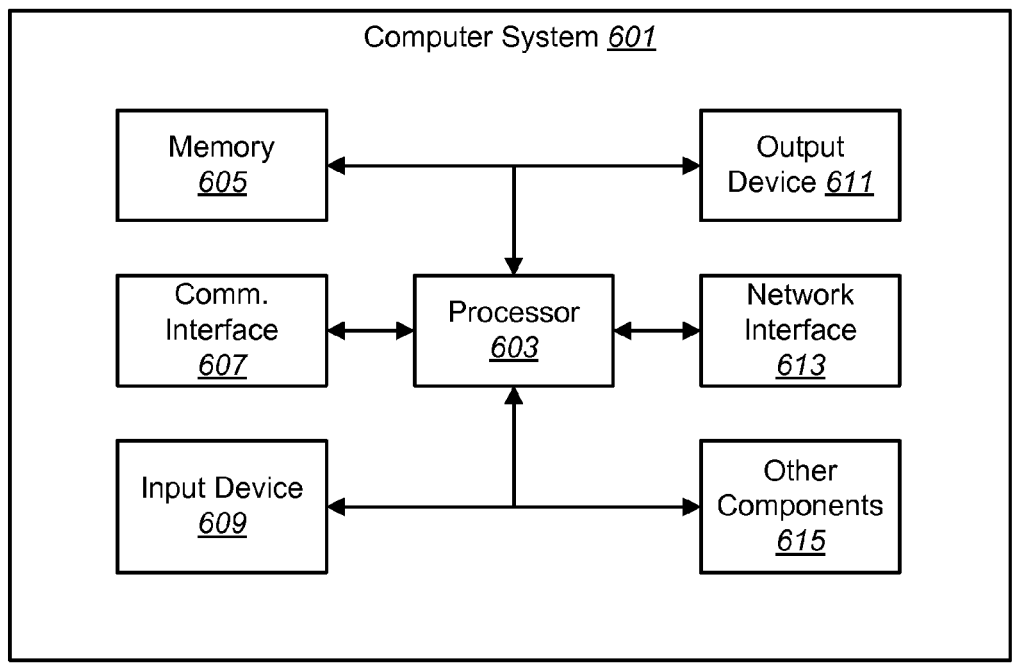
FIG. 6 illustrates various components that may be utilized in a computer system.

FIG. 6 illustrates various components that may be utilized in a computer system 601. One or more computer systems 601 may be used to implement the various systems and methods disclosed herein. The illustrated components may be located within the same physical structure or in separate housings or structures. Thus, the term computer or computer system 601 is used to mean one or more broadly defined computing devices unless it is expressly stated otherwise. Computing devices include the broad range of digital computers including microcontrollers, hand-held computers, personal computers, servers, mainframes, supercomputers, minicomputers, workstations, electronic book readers, and any variation or related device thereof.

The computer system 601 is shown with a processor 603 and memory 605. The processor 603 may control the operation of the computer system 601 and may be embodied as a microprocessor, a microcontroller, a digital signal processor (DSP) or other device known in the art. The processor 603 typically performs logical and arithmetic operations based on program instructions stored within the memory 605. The instructions in the memory 605 may be executable to implement the methods described herein.

The computer system 601 may also include one or more communication interfaces 607 and/or network interfaces 613 for communicating with other electronic devices. The communication interface(s) 607 and the network interface(s) 613 may be based on wired communication technology, wireless communication technology, or both.

The computer system 601 may also include one or more input devices 609 and one or more output devices 611. The input devices 609 and output devices 611 may facilitate user input. Other components 615 may also be provided as part of the computer system 601.

FIG. 6 illustrates only one possible configuration of a computer system 601. Various other architectures and components may be utilized.

Figure 7:
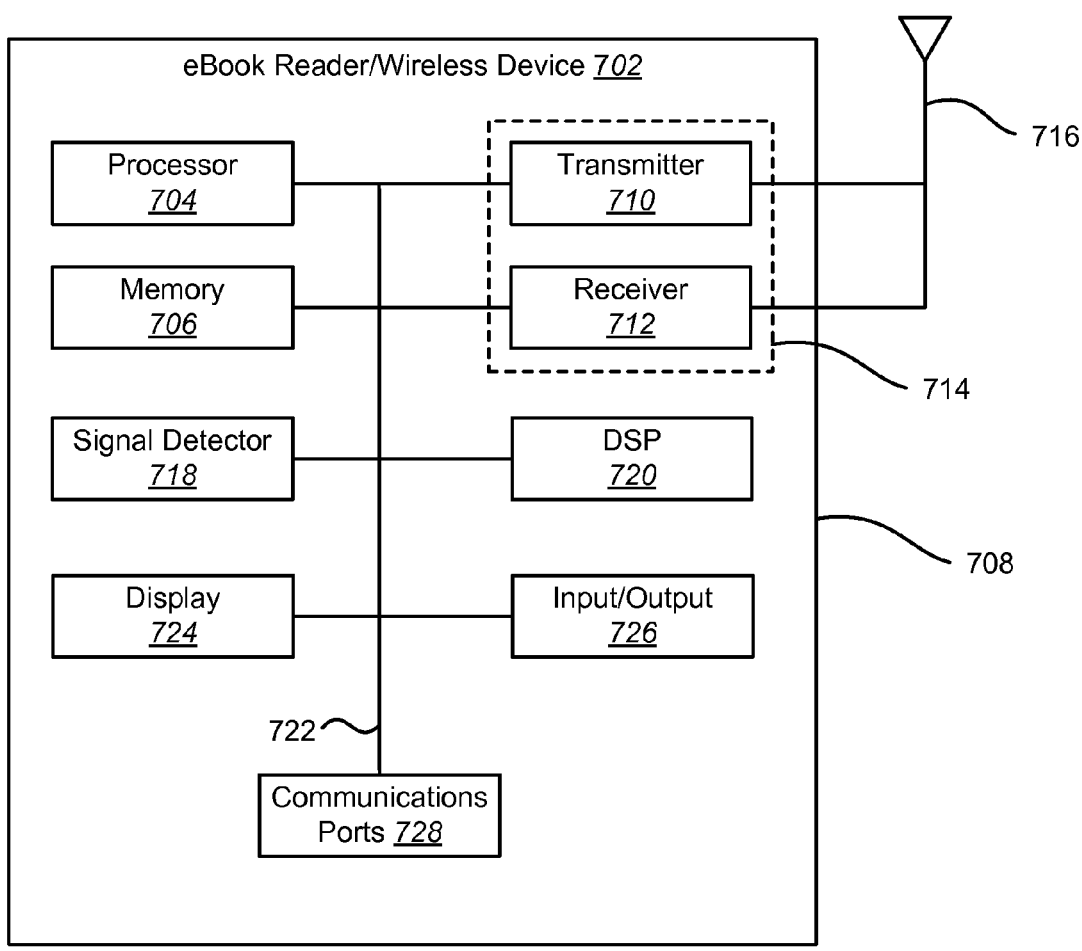
FIG. 7 is a block diagram of one configuration of an electronic book (eBook) reader/wireless device.

FIG. 7 illustrates various components that may be utilized in an eBook reader/wireless device 702. The device 702 is an example of a device that may be configured to implement and/or be used with the various methods described herein. Examples of devices 702 include, but are not limited to, cell phones, laptop computers, personal digital assistants (PDA), tablet computers, set-top boxes, game consoles, and eBook reader devices.

The wireless device 702 may include a processor 704 which controls operation of the wireless device 702. The processor 704 may also be referred to as a central processing unit (CPU). Memory 706, which may include both read-only memory (ROM) and random access memory (RAM), provides instructions and data to the processor 704. A portion of the memory 706 may also include non-volatile random access memory (NVRAM). The processor 704 typically performs logical and arithmetic operations based on program instructions stored within the memory 706. The instructions in the memory 706 may be executable to implement the methods described herein.

The wireless device 702 may also include a housing 708 that may include a transmitter 710 and a receiver 712 to allow transmission and reception of data between the wireless device 702 and a remote location. The transmitter 710 and receiver 712 may be combined into a transceiver 714. An antenna 716 may be attached to the housing 708 and electrically coupled to the transceiver 714. The wireless device 702 may also include (not shown) multiple transmitters, multiple receivers, multiple transceivers and/or multiple antenna.

The wireless device 702 may also include a signal detector 718 that may be used to detect and quantify the level of signals received by the transceiver 714. The signal detector 718 may detect such signals as total energy, pilot energy per pseudonoise (PN) chips, power spectral density, and other signals. The wireless device 702 may also include a digital signal processor (DSP) 720 for use in processing signals.

The wireless device 702 may also include one or more communication ports 728. Such communication ports 728 may allow direct wired connections to be easily made with the device 702.

Additionally, input/output components 726 may be included with the device 702 for various input and output to and from the device 702. Examples of different kinds of input components include a keyboard, keypad, mouse, microphone, remote control device, buttons, joystick, trackball, touchpad, lightpen, etc. Examples of different kinds of output components include a speaker, printer, etc. One specific type of output component is a display 724.

The various components of the wireless device 702 may be coupled together by a bus system 722 which may include a power bus, a control signal bus, and a status signal bus in addition to a data bus. However, for the sake of clarity, the various busses are illustrated in FIG. 7 as the bus system 722.

As used herein, the term "determining" encompasses a wide variety of actions and, therefore, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, modules and circuits described herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor may read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that may be accessed by a computer. By way of example, and not limitation, a computer-readable medium may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for providing digital works based on user preferences, the method comprising:
   receiving, by a computer system, an identification of words, sentences, or both, of digital works consumed by a user of an electronic book reading device;
   receiving, by the computer system, an identification of words, sentences, or both, of digital works not consumed by the user;
   analyzing, by the computer system, data associated with a plurality of digital works;
   classifying, by the computer system, the plurality of digital works based, at least in part, on the data analysis and on a first list and on a second list, wherein the first list identifies preferred words included in the digital works consumed by the user, and wherein the second list identifies non-preferred words included in the digital works not consumed by the user; and
   transmitting, by the computer system, one or more digital works from the plurality of digital works, wherein the one or more digital works transmitted were classified as works to be transmitted using the first list.

2. The method of claim 1, further comprising receiving training data.

3. The method of claim 2, wherein the training data comprises at least two sets of data.

4. The method of claim 2, further comprising adjusting a ranking threshold in accordance with the received training data.

5. The method of claim 1, further comprising assigning a ranking to each of the plurality of digital works based, at least in part, on the first list and the second list.

6. The method of claim 1, wherein the classification uses a plurality of bins to organize the plurality of digital works.

7. The method of claim 1, wherein the one or more digital works are transmitted to an electronic book reader.

8. The method of claim 1, further comprising rearranging contents of a digital work based on the first list and on the second list.

9. An electronic book reading device comprising:
a display;
a processor;
memory in electronic communication with the processor; and
instructions stored in the memory, the instructions being executable to:
receive input from an input component on the electronic book reading device, wherein the input component is configured for receiving user input;
collect identifiers of words, sentences, or both, of digital works consumed by a user of the electronic book reading device;
collect identifiers of words, sentences, or both, of digital works not consumed by the user;
store a first list in the memory, wherein the first list identifies preferred words, the preferred words being included in the digital works consumed by the user;
store a second list in the memory, wherein the second list identifies non-preferred words, the non-preferred words being included in the digital works not consumed by the user; and
upload the first list and the second list to a server.

10. The device of claim 9, wherein the input comprises a request to access a digital work.

11. The device of claim 10, wherein at least a portion of the preferred words comprise words associated with the accessed digital work.

12. The device of claim 10, wherein at least a portion of the non-preferred words comprise words associated with a skipped digital work.

13. The device of claim 9, wherein the preferred words are associated with digital works that have been opened or viewed on the electronic book reading device, and wherein the non-preferred words are associated with digital works that have been skipped or not accessed on the electronic book reading device.

14. A computer system that is configured to provide digital works based on user preferences, the computer system comprising:
a processor;
memory in electronic communication with the processor;
instructions stored in the memory, the instructions being executable to:
receive training data associated with a plurality of digital works;
analyze the training data;
classify the plurality of digital works based, at least in part, on the data analysis and on a first list and on a second list, wherein the first list comprises preferred words, and wherein the second list comprises non-preferred words; and
transmit one or more digital works from the plurality of digital works, wherein the one or more digital works transmitted were classified as works to be sent using the first list.

15. The computer system of claim 14, wherein the training data comprises at least two sets of data.

16. The computer system of claim 15, wherein a first set of data comprises preferred words, and wherein the preferred words are included in a digital work that a user of an electronic device has shown interest in.

17. The computer system of claim 15, wherein a second set of data comprises non-preferred words, and wherein the non-preferred words are included in a digital work that the user has not shown interest in.

18. The computer system of claim 14, wherein the instructions are further executable to adjust a ranking threshold in accordance with the received training data.

19. The computer system of claim 14, wherein the instructions are further executable to assign a ranking to each of the plurality of digital works based, at least in part, on the first list and the second list.

20. The computer system of claim 14, wherein the computer system comprises a server.

21. A non-transitory computer-readable medium comprising instructions executable by a processor to perform operations comprising:
receiving training data associated with a plurality of digital works;
analyzing the training data;
classifying the plurality of digital works based, at least in part, on the data analysis and on a first list and on a second list, wherein the first list comprises preferred words, and wherein the second list comprises non-preferred words; and
transmitting one or more digital works from the plurality of digital works, wherein the one or more digital works transmitted were classified as works to be transmitted using the first list.

22. The non-transitory computer-readable medium of claim 21, wherein the training data comprises at least two sets of data.

23. The non-transitory computer-readable medium of claim 22, wherein a first set of data comprises preferred words, and wherein the preferred words are included in a digital work that a user of an electronic device has shown interest in.

24. The non-transitory computer-readable medium of claim 23, wherein a second set of data comprises non-preferred words, and wherein the non-preferred words are included in a digital work that the user has not shown interest in.

25. A computer-readable storage medium comprising instructions executable by a processor to perform operations comprising:
collecting, by an electronic book reading device, identifiers of words, sentences, or both, of digital works consumed by a user of the electronic book reading device;
collecting, by the electronic book reading device, identifiers of words, sentences, or both, of digital works not consumed by the user;
storing, by the electronic book reading device, a first list identifying words, sentences, or both, included in the digital works consumed by the user in a first list;
storing, by the electronic book reading device, a second list identifying words, sentences, or both, included in the digital works not consumed by the user; and
uploading, by the electronic book reading device, the first list and the second list to a server.

* * * * *